(12) United States Patent
Amano et al.

(10) Patent No.: US 9,329,776 B2
(45) Date of Patent: May 3, 2016

(54) DISPLAY CONTROL DEVICE, METHOD AND COMPUTER PROGRAM PRODUCT

(75) Inventors: Ryoko Amano, Tokyo (JP); Takashi Nunomaki, Kanagawa (JP); Kenzo Nishikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 966 days.

(21) Appl. No.: 13/281,490

(22) Filed: Oct. 26, 2011

(65) Prior Publication Data
US 2012/0162242 A1 Jun. 28, 2012

(30) Foreign Application Priority Data
Dec. 27, 2010 (JP) ................................ 2010-291081

(51) Int. Cl.
*G09G 5/02* (2006.01)
*G06F 3/0488* (2013.01)
*H04N 5/232* (2006.01)

(52) U.S. Cl.
CPC ........ *G06F 3/04886* (2013.01); *H04N 5/23293* (2013.01)

(58) Field of Classification Search
CPC ... G06F 3/0482; G06F 3/0481; G06F 9/4443; G06F 3/04817; H04N 5/44543
USPC .......................................................... 715/810
See application file for complete search history.

(56) References Cited

U.S. PATENT DOCUMENTS

| | | | | |
|---|---|---|---|---|
| 5,119,079 A | * | 6/1992 | Hube et al. | ..................... 715/823 |
| 5,745,717 A | * | 4/1998 | Vayda | ................... G06F 3/0482 715/834 |
| 5,798,760 A | | 8/1998 | Vayda et al. | |
| 5,828,376 A | * | 10/1998 | Solimene | .............. G06F 3/0482 715/821 |
| 6,717,600 B2 | * | 4/2004 | Dutta | .................. G06F 3/04842 715/856 |
| 6,886,138 B2 | * | 4/2005 | Laffey et al. | ................... 715/860 |
| 7,730,401 B2 | * | 6/2010 | Gillespie et al. | .............. 715/702 |
| 8,284,170 B2 | * | 10/2012 | Bernstein | ....................... 345/174 |
| 8,386,965 B2 | * | 2/2013 | Fleizach et al. | ............... 715/865 |
| 8,427,437 B2 | * | 4/2013 | Chae et al. | ..................... 345/173 |
| 8,645,863 B2 | * | 2/2014 | Mandic et al. | ................ 715/813 |
| 8,646,189 B2 | * | 2/2014 | Tjerrild | ............................ 34/166 |
| 8,730,180 B2 | * | 5/2014 | Kim | .............................. 345/173 |

(Continued)

FOREIGN PATENT DOCUMENTS

| | | |
|---|---|---|
| JP | 5-197494 A | 8/1993 |
| JP | 2002-358162 | 12/2002 |

(Continued)

OTHER PUBLICATIONS ("Sony Cyber-shot T900 Review" by Brad Soo on Apr. 28 2009; http://dpinterface.com/2009/04/28/sony-cybershot-t900-review/; last accessed on Oct. 4, 2014.*

(Continued)

*Primary Examiner* — Jung-Mu Chuang
(74) *Attorney, Agent, or Firm* — Oblon, McClelland, Maier & Neustadt, L.L.P.

(57) ABSTRACT

A graphical user interface apparatus, method and computer program product cooperate to control a display. An item is displayed at a periphery of a display and a detector detects when an object is proximate to the item. When detected the display displays a relation item. Then, when the object is detected as moving to be proximate to the relation item, a controller changes a displayed form of the relation item in response to detecting when the object is moved.

29 Claims, 11 Drawing Sheets

(56) References Cited

U.S. PATENT DOCUMENTS

| | | | |
|---|---|---|---|
| 2002/0191029 A1* | 12/2002 | Gillespie et al. | 345/810 |
| 2004/0178994 A1* | 9/2004 | Kairls, Jr. | 345/173 |
| 2004/0255271 A1* | 12/2004 | Lim | 717/110 |
| 2005/0071761 A1* | 3/2005 | Kontio | 715/711 |
| 2005/0253808 A1* | 11/2005 | Yoshida | 345/156 |
| 2006/0220894 A1* | 10/2006 | Stimson et al. | 340/815.4 |
| 2006/0239588 A1* | 10/2006 | Hull et al. | 382/285 |
| 2008/0062127 A1* | 3/2008 | Brodersen | G06F 3/0482 345/158 |
| 2009/0007012 A1* | 1/2009 | Mandic et al. | 715/810 |
| 2009/0015549 A1* | 1/2009 | Gelfond et al. | 345/156 |
| 2009/0239588 A1* | 9/2009 | Nam | 455/566 |
| 2009/0289914 A1* | 11/2009 | Cho | 345/173 |
| 2009/0295715 A1* | 12/2009 | Seo et al. | 345/156 |
| 2010/0060597 A1* | 3/2010 | Choi et al. | 345/173 |
| 2010/0079405 A1* | 4/2010 | Bernstein | G06F 3/04883 345/174 |
| 2010/0107099 A1* | 4/2010 | Frazier | G06F 3/044 715/765 |
| 2010/0137027 A1* | 6/2010 | Kim | 455/556.1 |
| 2010/0153876 A1* | 6/2010 | Kim et al. | 715/800 |
| 2010/0306650 A1* | 12/2010 | Oh et al. | 715/702 |
| 2011/0012856 A1* | 1/2011 | Maxwell et al. | 345/173 |
| 2011/0109577 A1* | 5/2011 | Lee et al. | 345/173 |
| 2011/0113371 A1* | 5/2011 | Parker | G06F 1/3215 715/810 |
| 2011/0163969 A1* | 7/2011 | Anzures | G06F 3/04883 345/173 |
| 2011/0179388 A1* | 7/2011 | Fleizach et al. | 715/840 |
| 2011/0298732 A1* | 12/2011 | Yoshimoto | G06F 3/041 345/173 |
| 2012/0176398 A1* | 7/2012 | Takaoka et al. | 345/589 |
| 2013/0263055 A1* | 10/2013 | Victor | G06F 3/0485 715/835 |
| 2014/0165006 A1* | 6/2014 | Chaudhri | G06F 3/04817 715/835 |

FOREIGN PATENT DOCUMENTS

| | | |
|---|---|---|
| JP | 2006-303714 A | 11/2006 |
| JP | 2008-505380 A | 2/2008 |
| JP | 2010-19643 A | 1/2010 |
| WO | WO 2010/013876 A1 | 2/2010 |

OTHER PUBLICATIONS

U.S. Appl. No. 14/000,762, filed Aug. 21, 2013, Nishikawa, et al.
U.S. Appl. No. 13/314,486, filed Dec. 8, 2011, Takaoka, et al.
U.S. Appl. No. 13/324,463, filed Dec. 13, 2011, Takaoka, et al.
U.S. Appl. No. 13/285,031, filed Oct. 31, 2011, Nunomaki.
U.S. Appl. No. 13/292,769, filed Nov. 9, 2011, Nunomaki.
Japanese Office Action issued Aug. 5, 2014 in Patent Application No. 2010-291081 (without English Translation).
Office Action issued in Japanese Application No. 201110428425.9 on Oct. 10, 2015 with English translation.
Brad Soo, "Sony Cyber-shot T900 Review", Apr. 28, 2009.

* cited by examiner

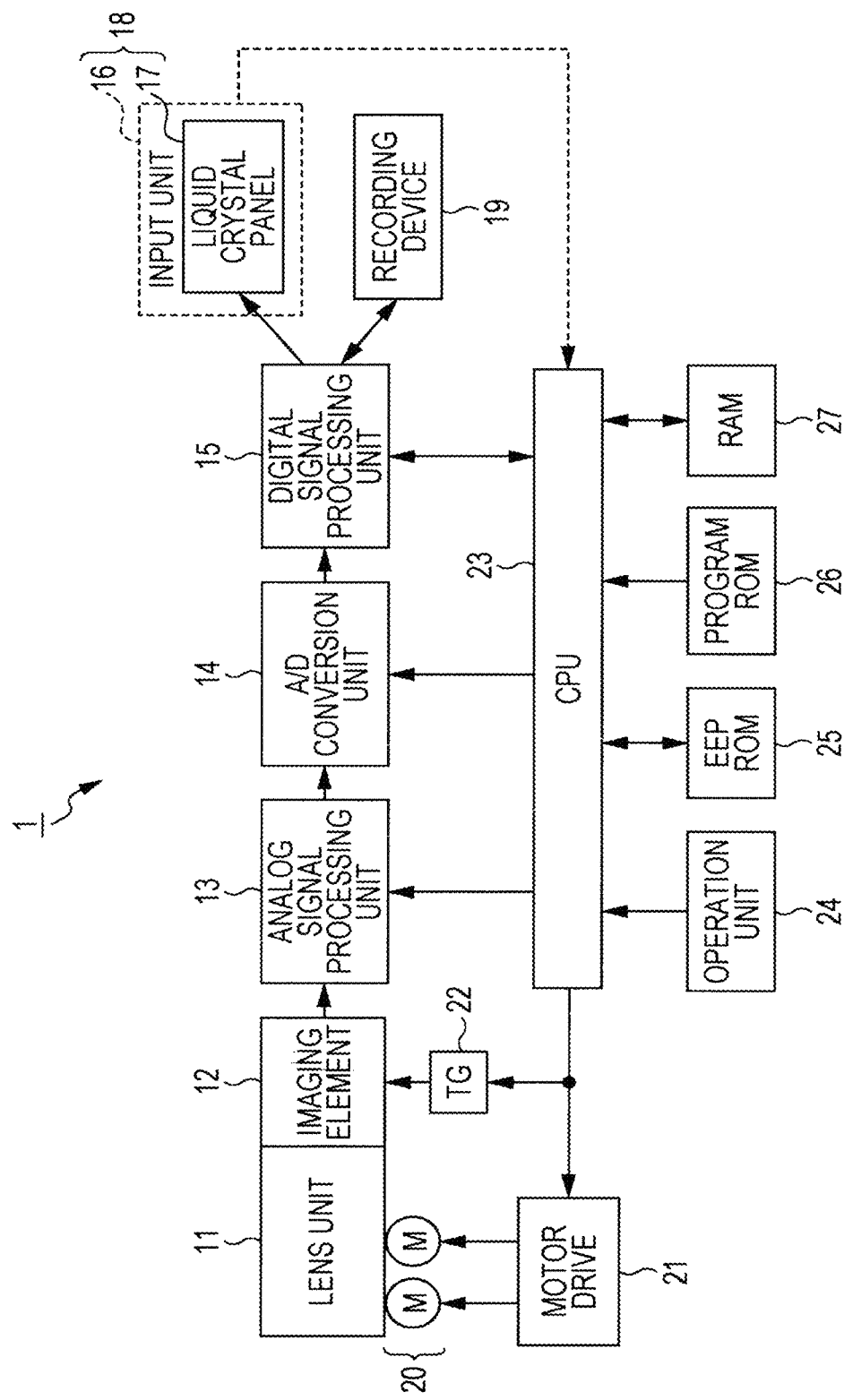

DISPLAY CONTROL DEVICE, METHOD AND COMPUTER PROGRAM PRODUCT

BACKGROUND

The present technology relates to a display control device, a display control method, and computer program product, and in particular, relates to a display control device, method, and computer program product that are suitable for use when display control is performed on a display device that can be operated by proximity.

In the past, a technique has been proposed in which, in a car navigation device, when a user causes a finger to be in proximity to a display screen, a predetermined menu is displayed in that neighborhood with being superimposed on a map so that the user touches the finger to the displayed menu to select an item. For example, such a technique is disclosed in Japanese Unexamined Patent Application Publication No. 2002-358162.

SUMMARY

However, in the technology described in Japanese Unexamined Patent Application Publication No. 2002-358162, it may be supposed that an erroneous operation occurs in which a user accidentally touches a finger to an unintended item in a menu and hence an undesired processing is executed.

In view of such a situation as described above, the present technology is made. In addition, it is desirable to reliably select a desired item from among items displayed on a display device that can be operated by proximity.

According to one non-limiting embodiment, an apparatus includes a controller that causes a display to display a relation item in response to receiving an indication of a detection of an object's proximity to a displayed item, the displayed item being displayed on a periphery of the display, and changes a displayed form of a portion of the relation item that is proximate to or in contact with the object as the object moves along the relation item.

According to one aspect, the controller is configured to change the displayed form of the relation item when a touch position of the object coincides with the relation item.

According to another aspect, the controller recognizes a proximity response area that is larger than a size of the item, the proximity response area being an area that is a criterion used when detecting if the object is proximate to the item.

According to another aspect, the proximity response area is a rectangular area that surrounds the item.

According to another aspect, the controller causes the display to highlight at least the item when the object is detected to be proximate to the item.

According to another aspect, the controller causes an options menu to be displayed when the object is detected as being proximate to the item.

According to another aspect, the options menu is translucently superimposed on an image displayed on the display, and the relation item includes the options menu.

According to another aspect, the proximity response area at least includes an area occupied by the options menu and the item.

According to another aspect, the options menu includes a plurality of icons having respective contact response areas, and the proximity response area at least including an area occupied by the respective contact response areas.

According to another aspect, the controller causes a selected icon of the plurality of icons to be highlighted on the display when the object is positioned proximate to the selected icon.

According to another aspect, the controller also causes a function guide to be displayed, the functions guide explains functions assigned to respective menu options on the options menu.

According to another aspect, the options menu is translucently displayed so that a background image remains at least partially visible on the display.

According to another aspect, the display includes an electrostatic touch panel.

According to another aspect, the controller highlights the item by at least one of changing a color, size, shape, design and brightness of the item.

According to another aspect, the options menu includes option icons that are lower in rank than the item.

According to another aspect, the options menu includes user-settable option icons.

According to another aspect, when the object is not within a predetermined detection range of the display, a selection state of the item is not changed.

According to another aspect, the controller changes at least one of the plurality of icons to another icon when the object touches the display.

According to another aspect, the plurality of icons remain present when the object touches the display and the object is then removed from the display by a distance further than a proximity detection range.

According to another aspect, the options menu includes a plurality of icons having respective contact response areas, at least one of the contact response areas being smaller in area than an area occupied by a corresponding icon.

According to another aspect, the controller recognizes a selection state of a function associated with the item when the object is detected proximate to the item, and the controller maintains the selection state even when the object is not moved to be proximate to the options menu.

In a method embodiment the method includes receiving an indication of a detection of an object's proximity to a displayed item; causing a display to display a relation item in response to the receiving, the displayed item being displayed on a periphery of the display, and changing a displayed form of a portion of the relation item that is proximate to or in contact with the object as the object moves along the relation item.

In a non-transitory computer storage device embodiment that has instructions stored therein that when executed by a processing circuit implement a process that includes receiving an indication of a detection of an object's proximity to a displayed item; causing a display to display a relation item in response to the receiving, the displayed item being displayed on a periphery of the display, and changing a displayed form of a portion of the relation item that is proximate to or in contact with the object as the object moves along the relation item.

According to an embodiment of the present technology, it is possible to reliably select a desired item from among items displayed on a display device that can be operated by proximity.

BRIEF DESCRIPTION OF THE DRAWINGS

FIG. 1 is a block diagram illustrating an example of a configuration of an embodiment of a digital camera to which the present technology is applied;

DETAILED DESCRIPTION OF EMBODIMENTS

Figure 2A:
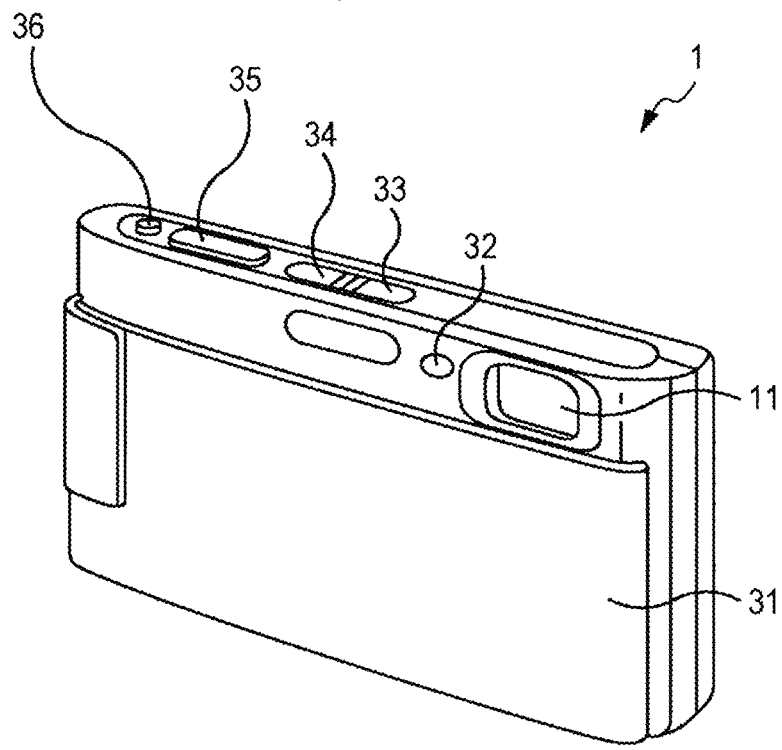
FIGS. 2A and 2B are perspective views illustrating examples of appearance configurations of the digital camera.

Hereinafter, the form for the implementation of the present technology (hereinafter, referred to as "embodiment") will be described. In addition, the embodiment will be described in the following order.

1. Embodiment
2. Modifications

<1. Embodiment>

[Example of Configuration of Digital Camera 1]

FIG. 1 is a block diagram illustrating an example of the configuration of an embodiment of a digital camera (digital still camera) 1 to which the present technology is applied.

A lens unit 11 includes an image-capturing lens, an aperture stop, a focus lens, and the like, and light entering the lens unit 11 is beamed into an imaging element 12.

For example, the imaging element 12 includes a charge coupled device (CCD), a complementary metal oxide semiconductor (CMOS) imager, or the like, subjects the light from the lens unit 11 to photoelectric conversion, and supplies, to an analog signal processing unit 13, an analog image signal obtained as the result thereof.

The analog signal processing unit 13 subjects the image signal from the imaging element 12 to analog signal processing such as correlated double sampling processing, automatic gain adjustment processing, and the like, and supplies the image signal subjected to the analog signal processing to an analog/digital (A/D) conversion unit 14.

The A/D conversion unit 14 A/D-converts the image signal from the analog signal processing unit 13, and supplies, to a digital signal processing unit 15, a digital image data obtained as the result thereof.

The digital signal processing unit 15 subjects the image data from the A/D conversion unit 14 to digital signal processing such as white balance adjustment processing, noise reduction processing, necessary compression-encoding processing (for example, Joint Photographic Experts Group (JPEG) encoding or the like), and the like, and supplies the image data to a display unit 17 in an input-output panel 18 and a recording device 19.

The input-output panel 18 includes an input unit 16 and a display unit 17.

The input unit 16 includes a device having a function for receiving (detecting) an input from the outside thereof, namely, for example, an electrostatic touch panel or the like, a set of a light source for light irradiation and a sensor for receiving the reflection of the light, reflected from an object, or the like.

The input unit 16 detects the proximity and touch (contact) of an object (for example, a finger of a user, a stylus pen used by the user, or the like) from the outside, and supplies a signal (hereinafter, referred to as "operation signal") indicating the proximity or touched position thereof to a CPU 23.

The display unit 17 includes a device (display device) for displaying an image, for example, a liquid crystal panel or the like, and displays an image in accordance with image data or the like supplied from the digital signal processing unit 15.

In the input-output panel 18, the input unit 16 and the display unit 1, described above, are integrated with each other, it is possible to display an image in the display unit 17, and in the input unit 16, it is possible to receive an operation input (here, both the proximity and the touch) from the outside with respect to an image displayed on the display unit 17.

In addition, hereinafter, an object such as a finger, a stylus pen, or the like used for an input (the proximity or the touch) to the input unit 16 in the input-output panel 18 is called an input tool.

In addition, in addition to the finger and the stylus pen, as the input tool, an arbitrary object may also be used that can be caused to be in proximity and touch so as to specify a position on the input unit 16 in the input-output panel 18.

For example, a disk such as a Digital Versatile Disc (DVD) or the like, a removable semiconductor memory (not illustrated) such as a memory card or the like, and another removable recording medium (not illustrated) can be attached and detached to and from the recording device 19. In addition, the recording device 19 performs recording and reproduction control on the attached recording medium. Namely, the recording device 19 records, in the recording medium, the image data from the digital signal processing unit 15, and reads out and supplies the image data recorded in the recording medium to the digital signal processing unit 15.

An actuator 20 is a motor that adjusts the focus lens and the aperture stop in the lens unit 11, and is driven by a motor drive 21.

The motor drive 21 drives the actuator 20 in accordance with the control of the central processing unit (CPU) 23.

A TG (Timing Generator) 22 supplies, to the imaging element 12, a timing signal used for adjusting an exposure time and the like in accordance with the control of the CPU 23.

By executing a program recorded in a program read only memory (ROM) 26 and furthermore a program recorded in an electrically erasable programmable ROM (EEPROM) 25 as necessary, the CPU 23 controls individual blocks included in the digital camera 1.

An operation unit 24 is a physical button or the like operated by the user, and supplies, to the CPU 23, a signal (hereinafter, referred to as "operation signal") corresponding to the operation of the user.

For example, the EEPROM 25 stores therein a program and data where the data is an imaging parameter or the like set by the user by operating the operation unit 24 or the like and it is also necessary for the data to be held when the power source of the digital camera 1 is turned off.

The program ROM 26 stores therein a program to be executed by the CPU 23, or the like.

A RAM 27 temporarily stores therein data and a program, necessary for the operation of the CPU 23.

In the digital camera 1 configured as described above, the CPU 23 executes a program recorded in the program ROM 26 or the like, thereby controlling individual portions of the digital camera 1.

On the other hand, the light entering the lens unit 11 is subjected to photoelectric conversion in the imaging element 12, and an image signal obtained as the result thereof is supplied to the analog signal processing unit 13. In the analog signal processing unit 13, the image signal from the imaging element 12 is subjected to analog signal processing, and is supplied to the A/D conversion unit 14.

In the A/D conversion unit 14, the image signal from the analog signal processing unit 13 is A/D-converted, and a digital image signal obtained as the result thereof is supplied to the digital signal processing unit 15.

In the digital signal processing unit 15, the image data from the A/D conversion unit 14 is subjected to digital signal processing, and is supplied to the display unit 17 in the input-output panel 18, thereby displaying a corresponding image, namely, a so-called through-the-lens image.

In addition, the CPU 23 executes predetermined processing in accordance with an operation signal from the input unit 16 in the input-output panel 18 or the operation unit 24.

Namely, for example, when the input unit 16 in the input-output panel 18 or the operation unit 24 is operated so that image-capturing is performed, the CPU 23 performs processing for capturing a still image as a photograph, causes the digital signal processing unit 15 to subject the image data from the A/D conversion unit 14 to compression-encoding processing, and causes the image data to be recorded in a recording medium through the recording device 19.

In addition, for example, when the input unit 16 in the input-output panel 18 or the operation unit 24 is operated so that reproduction is performed, the CPU 23 controls the digital signal processing unit 15, thereby causing the image data to be read out from the recording medium through the recording device 19.

Furthermore, the CPU 23 causes the digital signal processing unit 15 to extend the image data read out from the recording medium, and supplies the image data to the input-output panel 18, thereby causing the image data to be displayed.

In addition, in response to the operation signal or the like from the input unit 16 in the input-output panel 18 or the operation unit 24, the CPU 23 supplies, to the input-output panel 18 through the digital signal processing unit 15, the image of a graphical user interface (GUI) used for performing the operation of the digital camera 1, the confirmation of various kinds of information, or the like.

In addition, for example, data used for the GUI is stored in the EEPROM 25 or the program ROM 26.

In addition, for example, the program to be executed by the CPU 23 can be installed from a removable recording medium to the digital camera 1, or can be downloaded through a network and installed to the digital camera 1.

Figure 2B:
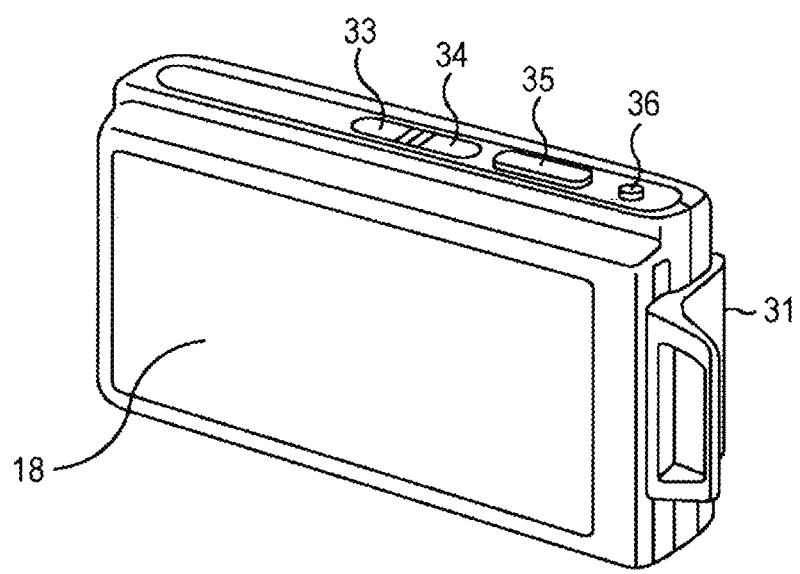

FIGS. 2A and 2B are perspective views illustrating examples of appearance configurations of the digital camera 1 in FIG. 1.

Namely, FIG. 2A is the perspective view of the front surface side of the digital camera 1 (a side directed toward a subject at the time of image-capturing), and FIG. 2B is the perspective view of the back surface side of the digital camera 1.

A lens cover 31 is provided so as to cover the front surface of the digital camera 1, and can move up and down.

When the lens cover 31 is located on an upper side, the lens unit 11 and the like are put into states in which the lens unit 11 and the like are covered. In addition, when the lens cover 31 is located on a lower side, the lens unit 11 and the like are exposed and the digital camera 1 is put into a state in which image-capturing can be performed.

In FIG. 2A, the lens cover 31 is located on the lower side, and the lens unit 11 is exposed.

An AF illuminator 32 is provided on the left side of the lens unit 11. For example, when the subject is darkened and it is difficult to focus on the subject with an AF function, the AF illuminator 32 emits light (auxiliary light) used for lighting the subject.

In addition, when a self-timer is used for image-capturing, the AF illuminator 32 also functions as a self-timer lamp that emits light so as to notify the user of image capturing timing based on the self-timer.

On the upper portion of the digital camera 1, a power button 33, a play button 34, a shutter button (release button) 35, and a zoom lever 36 are provided that are included in the operation unit 24 in FIG. 1.

The power button 33 is operated when the power source of the digital camera 1 is switched on and off, and the play button 34 is operated when image data recorded in the recording medium attached to the recording device 19 (in FIG. 1) is reproduced.

The shutter button (release button) 35 is operated when image data is recorded in the recording medium attached to the recording device 19 (in FIG. 1) (a photograph (still image) is captured), and the zoom lever 36 is operated when zoom is adjusted.

On the rear face of the digital camera 1, the input-output panel 18 is provided. On the input-output panel 18, a through-the-lens image, a GUI, or the like is displayed.

By causing the input tool to be in proximity to the input-output panel 18 or touching the input tool to the input-output panel 18, the user can supply various kinds of (operation) inputs to the digital camera 1.

[Example of Configuration of Function Realized by CPU 23]

Figure 3:
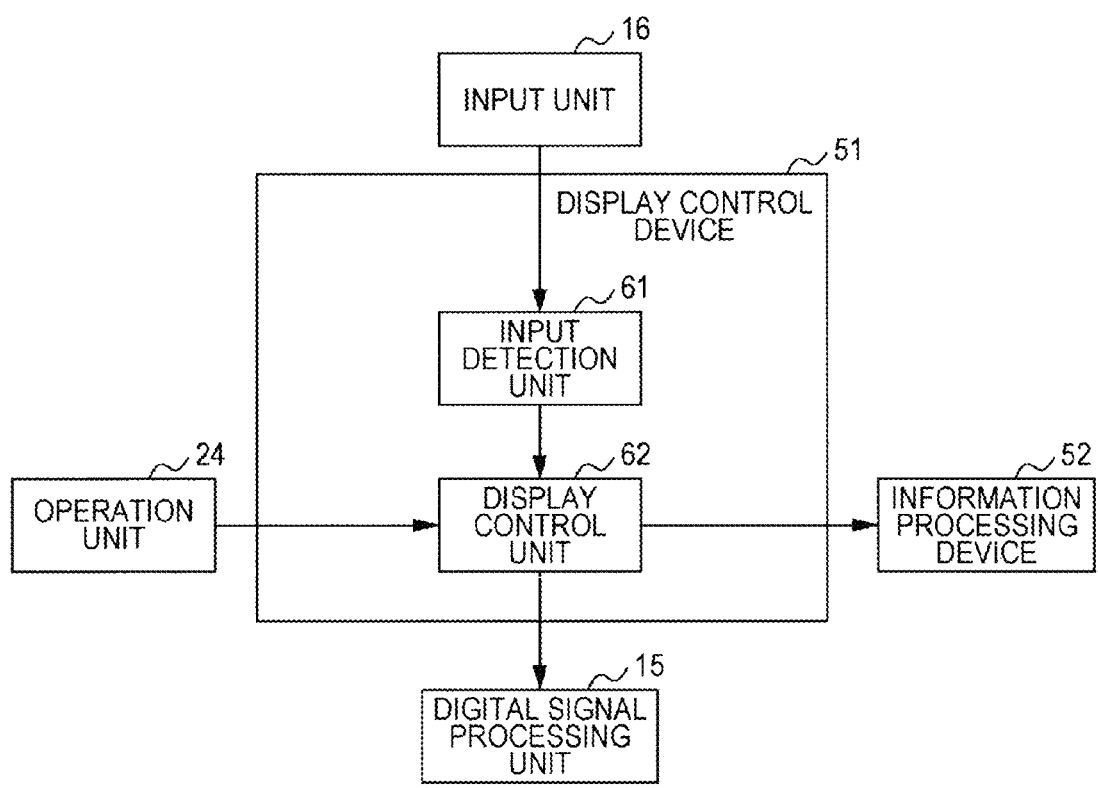
FIG. 3 is a block diagram illustrating an example of a configuration of a function realized by a CPU in the digital camera.

FIG. 3 is a block diagram illustrating an example of a configuration of a portion of a function realized by the CPU 23 in FIG. 1 by executing a predetermined control program. The CPU 23 executes the predetermined control program, thereby realizing a function including functions in which the CPU 23 operates as a display control device 51 and an information processing device 52.

In response to an operation on the input unit 16 in the input-output panel 18 (the proximity or touch of the input tool) and an operation on the operation unit 24, the display control device 51 causes the GUI to be displayed on the display unit 17 in the input-output panel 18 through the digital signal processing unit 15, in order to perform the operation of the digital camera 1, the confirmation of various kinds of information, or the like.

The display control device 51 is configured so as to include an input detection unit 61 and a display control unit 62.

On the basis of the operation signal from the input unit 16 in the input-output panel 18, the input detection unit 61 detects an input (the proximity or touch of the input tool) from the outside to the input unit 16 in the input-output panel 18 and a position or the like on the input unit 16 subjected to the proximity or touch of the input tool. In addition, the input detection unit 61 supplies, to the display control unit 62, information including these detection results as operation information indicating an operation performed by the user on the input unit 16 in the input-output panel 18.

In response to an operation signal from the operation unit 24 and a user operation indicated by the operation information from the input detection unit 61, the display control unit 62 causes the GUI to be displayed on the display unit 17 in the input-output panel 18 through the digital signal processing unit 15, on the basis of data or the like stored in the EEPROM 25 or the program ROM 26.

In addition, on the basis of the operation information from the input detection unit 61, the display control unit 62 recognizes the function of the digital camera 1, the execution of the function being ordered by the user by operating the input unit 16 with respect to the GUI displayed on the display unit 17 in the input-output panel 18. In addition, the display control unit 62 notifies the information processing device 52 of the recognized function.

The information processing device 52 controls individual portions of the digital camera 1 and causes the individual portions to execute the function given notice of by the display control unit 62.

[Display Example of Input-Output Panel 18]

Figure 4:
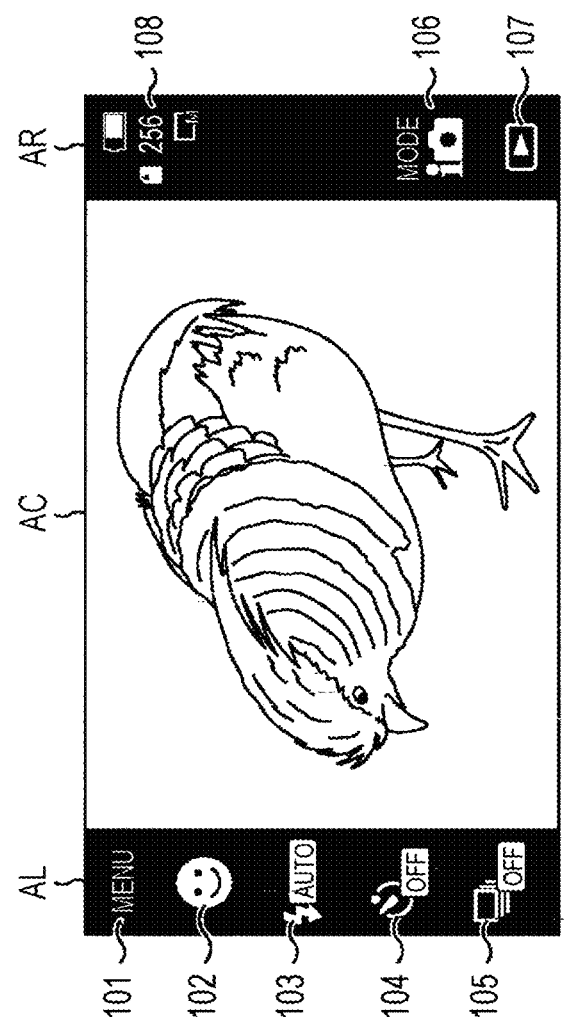
FIG. 4 is a diagram illustrating a display example of an image capturing standby screen.

FIG. 4 is a diagram illustrating a display example of the display screen of the display unit 17 in the input-output panel 18.

FIG. 4 illustrates a display example of the display screen of the display unit 17 in the input-output panel 18 in a state in which the digital camera 1 is in an image capturing standby state and the input unit 16 is not subjected to the proximity or touch of the input tool.

Here, the image capturing standby state means a state in which, if the shutter button 35 (in FIG. 2) is operated, the capturing of a photograph (still image) is performed (a state in which an image is captured and recorded in the recording medium attached to the recording device 19 (in FIG. 1)).

In the display screen in FIG. 4, within a central area AC other than vertically long strip-shaped areas AL and AR located on both sides, a through-the-lens image is displayed. In addition, icons 101 to 105 to which predetermined functions are assigned are displayed in tandem with predetermined sizes at predetermined positions within the area AL. Furthermore, icons 106 and 107 to which predetermined functions are assigned and an icon group 108 indicating the state or the like of the digital camera 1 are displayed in tandem with predetermined sizes at predetermined positions within the area AR.

In addition, for example, the icon group 108 includes icons indicating the remaining amount of a battery in the digital camera 1, the number of photographs (still images) that can be recorded in a recording medium, an image capturing mode already set, and the like.

For example, by causing the input tool to be in proximity to or touch the icons 101 to 107 on the display screen in FIG. 4, the user can cause the digital camera 1 to execute functions assigned to individual icons.

In addition, hereinafter, the display screen in FIG. 4 is referred to as an image capturing standby screen.

In addition, hereinafter, it is assumed that the lateral directions of the input unit 16 and the display unit 17 in the input-output panel 18 are x-axis directions and the vertical directions thereof are y-axis directions. Accordingly, for example, the lateral direction of the image capturing standby screen in FIG. 4 is the x-axis direction and the vertical direction thereof is the y-axis direction.

Furthermore, hereinafter, in some case, the descriptions of the input unit 16 and the display unit 17 in the input-output panel 18 will be omitted, and the input unit 16 and the display unit 17 in the input-output panel 18 will be simply described as the input-output panel 18. For example, in some case, a phrase "the display unit 17 in the input-output panel 18 displays an image" is described as a phrase "the input-output panel 18 displays an image", and a phrase "the input unit 16 in the input-output panel 18 is subjected to the proximity or touch of the input tool" is described as a phrase "the input-output panel 18 is subjected to the proximity or touch of the input tool".

[Display Control Processing When Image Capturing Mode Icon is Operated]

Figure 5:
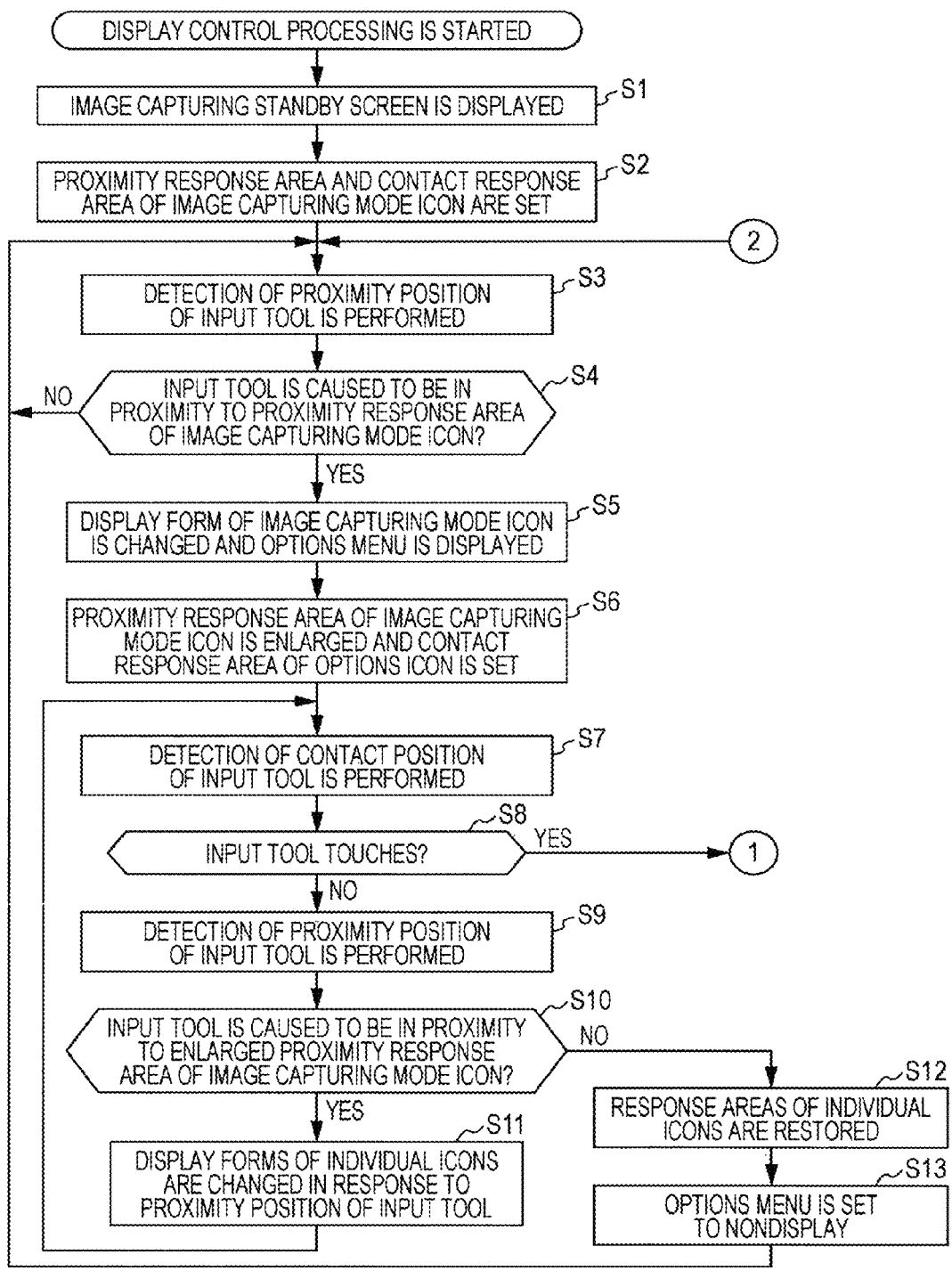
FIG. 5 is a flowchart for explaining display control processing executed by the digital camera.
Figure 6:
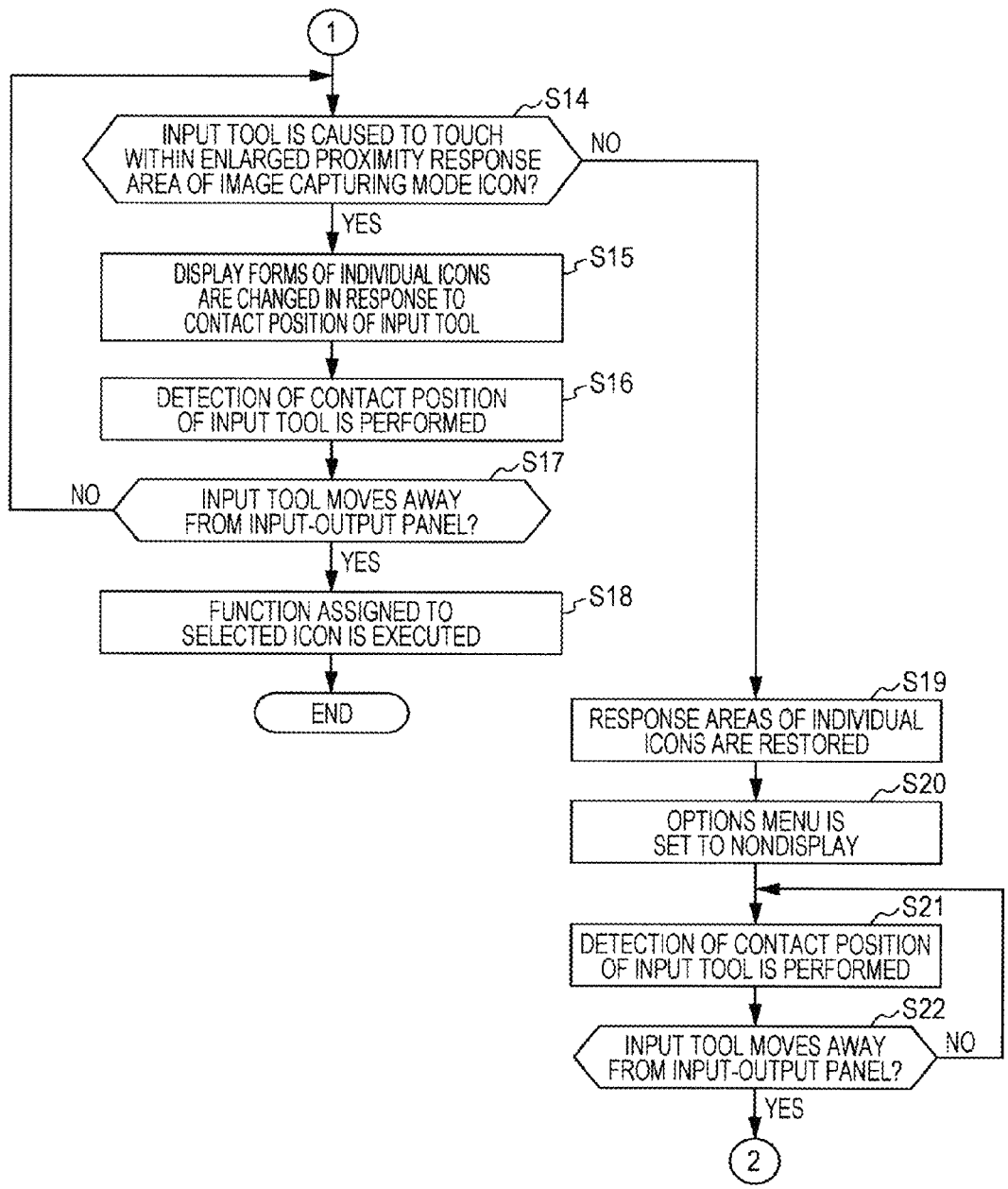
FIG. 6 is a flowchart for explaining display control processing executed by the digital camera.

Next, with reference to flowcharts in FIG. 5 and FIG. 6, focusing on the icon 106 (hereinafter, referred to as an image capturing mode icon 106) used for setting an image capturing mode in the image capturing standby screen in FIG. 4, display control processing will be described that is executed by the digital camera 1 when the image capturing mode icon 106 is operated.

In addition, for example, this processing is started when the power source of the digital camera 1 is turned on or an operation for causing the input-output panel 18 to display the image capturing standby screen is performed on the input-output panel 18 or the operation unit 24.

In addition, hereinafter, for convenience of description, the description of processing other than processing relating to the operation performed on the image capturing mode icon 106 (for example, processing performed when an icon other than the image capturing mode icon 106 is operated, or the like) will be omitted.

In Step S1, the digital camera 1 displays the image capturing standby screen. Specifically, the imaging element 12 supplies, to the analog signal processing unit 13, an image signal obtained as the result of image capturing. The analog signal processing unit 13 subjects the image signal from the imaging element 12 to analog signal processing, and supplies the image signal to the A/D conversion unit 14. The A/D conversion unit 14 A/D-converts the image signal from the analog signal processing unit 13, and supplies, to the digital signal processing unit 15, a digital image data obtained as the result thereof. The digital signal processing unit 15 subjects the image data from the A/D conversion unit 14 to digital signal processing, and supplies the image data to the input-output panel 18. On the basis of the image signal from the digital signal processing unit 15, the input-output panel 18 displays a through-the-lens image in the area AC in the image capturing standby screen.

In addition, the display control unit 62 causes the icons 101 to 105 to be displayed in tandem in the area AL in the image capturing standby screen through the digital signal processing unit 15, and causes the image capturing mode icon 106, the icon 107, and the icon group 108 to be displayed in tandem in the area AR in the image capturing standby screen.

In Step S2, the display control unit 62 sets a proximity response area and a contact response area of the image capturing mode icon 106.

Here, the proximity response area is an area to be a criterion used for detecting the proximity of the input tool to individual icons such as an icon, a character string, a thumbnail, and the like, displayed on the input-output panel 18. In addition, the contact response area is an area to be a criterion used for detecting the contact of the input tool with individual items displayed on the input-output panel 18.

Figure 7:
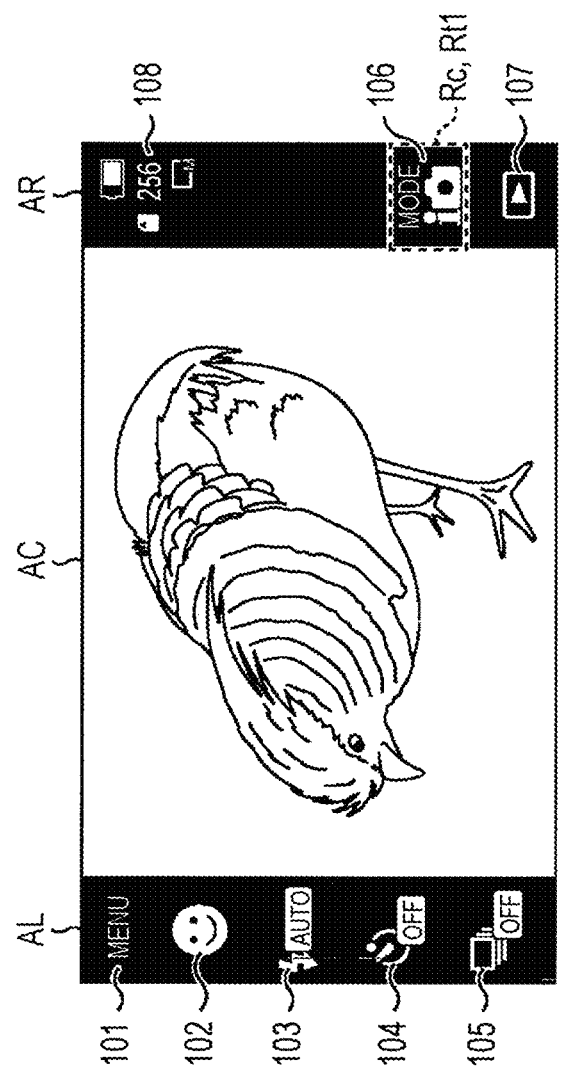
FIG. 7 is a diagram illustrating examples of a proximity response area and a contact response area of an image capturing mode icon.

FIG. 7 illustrates examples of a proximity response area Rc and a contact response area Rt1, set with respect to the image capturing mode icon 106 in processing performed in Step S2. The proximity response area Rc is slightly larger than the physical appearance of the image capturing mode icon 106, and is set to a rectangular area surrounding the image capturing mode icon 106. In addition, the contact response area Rt1 is set to the same area as the proximity response area Rc.

In Step S3, the input detection unit 61 performs the detection of the proximity position of the input tool on the basis of the operation signal from the input-output panel 18. The input detection unit 61 supplies, to the display control unit 62, operation information including the detection result of the proximity position of the input tool.

In Step S4, the display control unit 62 determines whether or not the input tool is caused to be in proximity to the proximity response area Rc of the image capturing mode icon 106. In addition, when the proximity of the input tool to the input-output panel 18 is not detected or the detected proximity position is out of the proximity response area Rc, it is determined that the input tool is not caused to be in proximity to the proximity response area Rc of the image capturing mode icon 106, and the processing returns to Step S3.

After that, in Step S4, until it is determined that the input tool is caused to be in proximity to the proximity response area Rc of the image capturing mode icon 106, processing operations in Steps S3 and S4 are repeatedly executed.

On the other hand, when, in Step S4, the proximity of the input tool to the input-output panel 18 is detected, and the detected proximity position is located within the proximity response area Rc, it is determined that the input tool is caused to be in proximity to the proximity response area Rc of the image capturing mode icon 106, and the processing proceeds to Step S5.

In Step S5, the display control unit 62 causes the display form of the image capturing mode icon 106 to be changed through the digital signal processing unit 15, and causes an options menu to be displayed.

Figure 8:
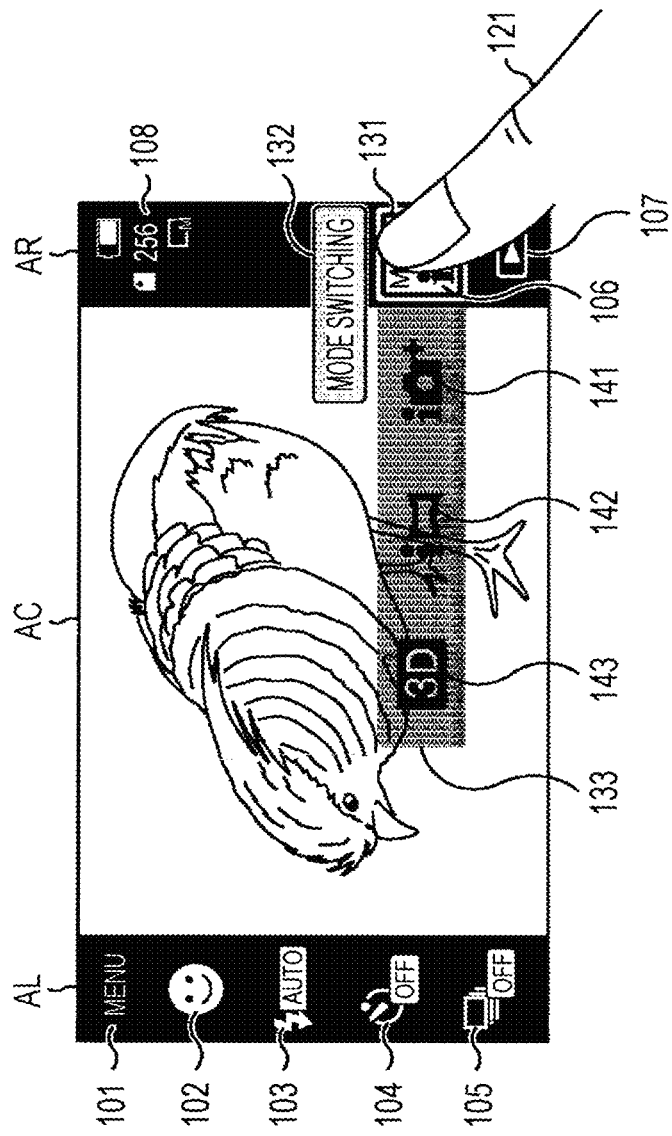
FIG. 8 is a diagram illustrating a display example of an options menu.

FIG. 8 illustrates an example of the display screen displayed on the input-output panel 18 in the processing in Step S5 when a finger 121 as the input tool is brought close to the image capturing mode icon 106.

In the display screen in FIG. 8, the image capturing mode icon 106 and the surrounding area thereof are displayed highlighted, and a cursor 131 is displayed so as to surround the image capturing mode icon 106. Accordingly, by bringing the finger 121 close to the image capturing mode icon 106, the user can intuitively recognize that the image capturing mode icon 106 is selected (the image capturing mode icon 106 reacts to the finger 121).

In addition, highlighted display and cursor display are examples, and it may also be indicated in another form that the image capturing mode icon 106 is selected. For example, the color, size, design, brightness, or the like of the image capturing mode icon 106 may also be changed. In addition, the combination of a plurality of the changes of display forms may also be adopted.

In addition, above the image capturing mode icon 106, as information relating to the image capturing mode icon 106, a function guide 132 is displayed that explains a function assigned to the image capturing mode icon 106. Accordingly, the user can easily and swiftly recognize the detail of the function assigned to the image capturing mode icon 106.

Furthermore, a landscape-oriented options menu 133 extends in a direction perpendicular to the area AR, on the left side of the image capturing mode icon 106, and is displayed so as to be superimposed on the through-the-lens image of the area AC. In addition, options icons 141 to 143 are displayed abreast with predetermined sizes at predetermined positions within the options menu 133.

The options icons 141 to 143 are icons relating to the image capturing mode icon 106. More specifically, the options icons 141 to 143 are icons belonging to the lower rank of the image capturing mode icon 106 in the menu system of the digital camera 1. In addition, a function for setting one of the image capturing modes of the digital camera 1 is assigned to each of the options icons 141 to 143.

In addition, the user can freely set the options icons 141 to 143 caused to be displayed on the options menu 133. For example, in order to swiftly set a frequently used image capturing mode, the user can set an icon corresponding to the image capturing mode to an options icon, and cause the icon to be displayed on the options menu 133.

Furthermore, the function guide 132 and the options menu 133 are translucently displayed so that the through-the-lens image of the background can be seen transparently. Accordingly, even in a state in which the function guide 132 and the options menu 133 are displayed, it is possible to certainly view the through-the-lens image of the background.

In such a way as described above, the options menu 133 is displayed that includes the options icons 141 to 143 relating to the image capturing mode icon 106 displayed at the periphery of the proximity position to which the input tool is in proximity.

In Step S6, the display control unit 62 enlarges the proximity response area of the image capturing mode icon 106, and sets the contact response areas of the options icons 141 to 143.

Figure 9:
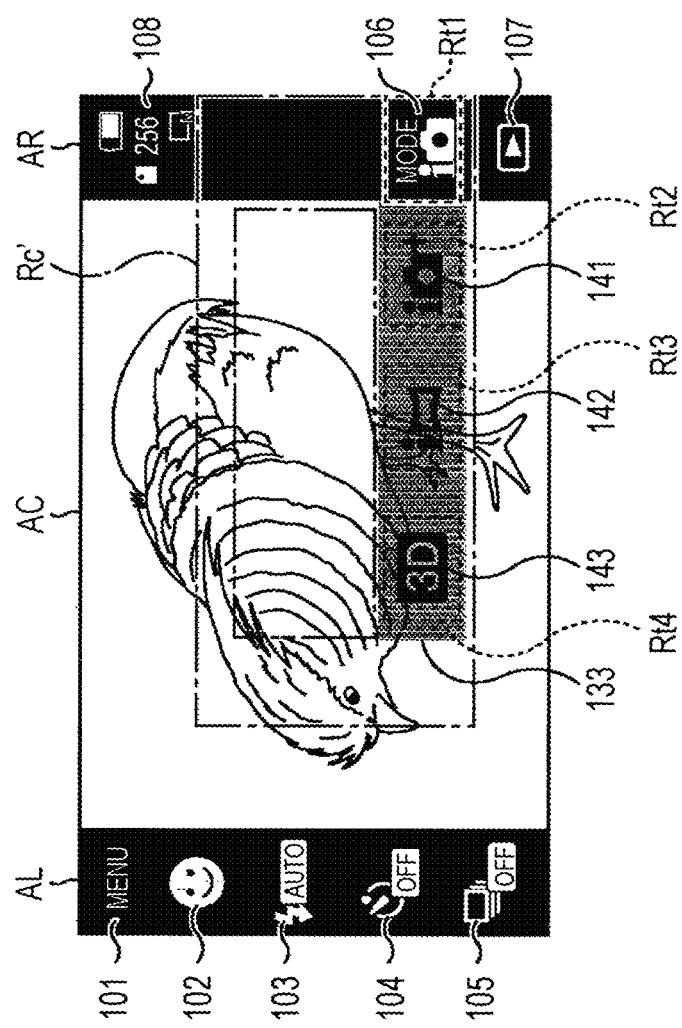
FIG. 9 is a diagram illustrating examples of an enlarged proximity response area of the image capturing mode icon and a contact response area of an options icon.

FIG. 9 illustrates the proximity response area Rc' of the image capturing mode icon 106 and the contact response areas Rt2 to Rt4 of the options icons 141 to 143, set in the processing performed in Step S6. In addition, in this drawing, in order to make this drawing understandable, the illustration of the cursor 131 and the function guide 132 and the highlighted display of the image capturing mode icon 106 are omitted. In addition, an area located above the options menu 133 and indicated by a two-dot chain line is an area in which the function guides of the options icons 141 to 143 are displayed, described later with reference to FIG. 10.

The proximity response area Rc' of the image capturing mode icon 106 is larger than the proximity response area Rc in FIG. 7, and is set to a rectangular area including the proximity response area Rc, the options menu 133, and a display area for the function guides of the options icons 141 to 143.

In addition, also, part or all of the display area for the function guides may not be included in the proximity response area Rc'.

The contact response areas Rt2 to Rt4 are slightly larger than the physical appearances of the options icons 141 to 143, respectively, and are set to rectangular areas surrounding the options icons 141 to 143, respectively.

In addition, the contact response area Rt1 of the image capturing mode icon 106 and the contact response areas Rt2 to Rt4 of the options icons 141 to 143 are set to almost the same size.

In Step S7, the input detection unit 61 performs the detection of the contact position of the input tool on the basis of the operation signal of the input-output panel 18. The input detection unit 61 supplies, to the display control unit 62, operation information including the detection result of the contact position of the input tool.

In Step S8, the display control unit 62 determines whether or not the input tool touches the input-output panel 18, on the basis of the detection result due to the input detection unit 61. When it is determined that the input tool does not touch the input-output panel 18, the processing proceeds to Step S9.

In Step S9, in the same way as in the processing in Step S3, the detection of the proximity position of the input tool is performed, and the operation information including the detection result of the proximity position of the input tool is supplied from the input detection unit 61 to the display control unit 62.

In Step S10, the display control unit 62 determines whether or not the input tool is caused to be proximity to the enlarged proximity response area Rc' of the image capturing mode icon 106. In addition, when the proximity of the input tool to the input-output panel 18 is detected and the detected proximity position is located within the proximity response area Rc', it is determined that the input tool is caused to be proximity to the enlarged proximity response area Rc', and the processing proceeds to Step S11.

In Step S11, in response to the proximity position of the input tool, the display control unit 62 changes the display forms or the like of individual icons through the digital signal processing unit 15.

Specifically, when the x coordinate of the proximity position of the input tool is located within a range in an x-axis direction of one of the contact response areas Rt1 to Rt4, the display control unit 62 determines that an icon corresponding to the contact response area is under selection.

In addition, hereinafter, an area defined by a range in the x-axis direction of each of the contact response areas Rt1 to Rt4 and a range in the y-axis direction of the proximity response area Rc' is called a selection determination area. For example, the selection determination area of the image capturing mode icon 106 turns out to be an area by a range in the x-axis direction of the contact response area Rt1 and a range in the y-axis direction of the proximity response area Rc'.

In addition, the display control unit 62 changes the display form of an icon determined to be under selection, and causes a function guide for explaining a function assigned to the icon to be displayed.

Figure 10:
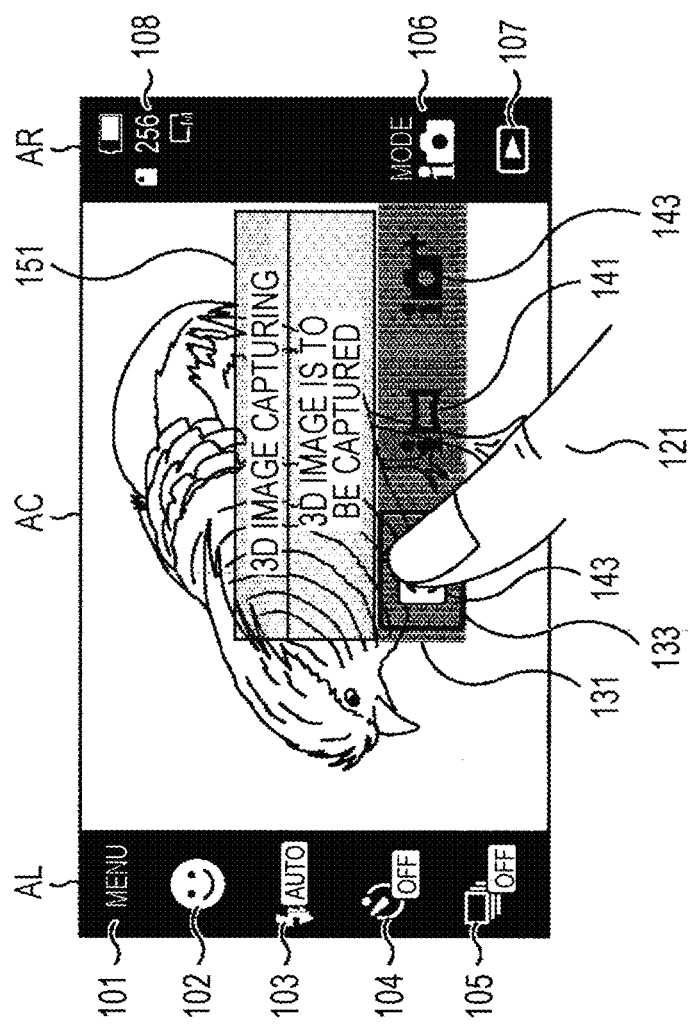
FIG. 10 is a diagram illustrating a display example of an image capturing standby screen when a finger is caused to be in proximity to the options icon.

For example, a case will be described in which, from the state illustrated in FIG. 8, the finger 121 is moved with staying in proximity to the input-output panel 18 and the finger 121 is positioned on the options icon 143 as illustrated in FIG. 10.

In this case, the x coordinate of the proximity position of the finger 121 is included in the selection determination area of the options icon 143, and hence it is determined that the options icon 143 is under selection. In addition, the options icon 143 is displayed highlighted, and the cursor 131 is displayed so as to surround the options icon 143. Namely, with the movement of the finger 121 that is the input tool, the display form of the options icon 143 is changed that is displayed at the periphery of the proximity position of the finger 121.

Accordingly, by moving the finger 121 with causing the finger 121 to stay in proximity to the input-output panel 18, the user can intuitively recognize that the selection of an icon is switched and an icon displayed in the proximity of the finger 121 is selected (the icon reacts to the finger 121).

In addition, in the same way as in the case of the image capturing mode icon 106 in FIG. 8, using another form other than highlighted display and cursor display or combining a plurality of the changes of display forms, it may also be indicated that each options icon is selected.

In addition, above the options menu 133, a function guide 151 is displayed that explains the name and the content of a function assigned to the options icon 143. Accordingly, the user can easily and swiftly recognize the detail of the function assigned to the options icon 143.

Furthermore, the function guide 151 is translucently displayed so that the through-the-lens image of the background can be seen transparently. Accordingly, even in a state in which the function guide 151 is displayed, it is possible to certainly view the through-the-lens image of the background.

In addition, when the proximity position of the input tool is not included in any one of selection determination areas of the icons, the selection state of the icon is not changed and is maintained without change.

For example, when, from the state illustrated in FIG. 10, the finger 121 is moved from a position above the options icon 143 to a position above the options icon 142, a state in which the proximity position of the finger 121 is not included in any one of the selection determination areas of the icons occurs on the way. At this time, the selection state of the options icon 143 is maintained without change, and the display screen in FIG. 10 is continuously displayed without change. In addition, when the proximity position of the finger 121 enters the selection determination area of the options icon 142, it is determined that the options icon 142 is under selection, the display form of the options icon 142 is changed, and the function guide of the options icon 142 is displayed.

Returning to FIG. 5, after that, the processing returns to Step S7. In addition, until, in Step S8, it is determined that the input tool touches the input-output panel 18 or in Step S10, it is determined that the input tool is not caused to be in proximity to the proximity response area Rc', the processing operations from Step S7 to Step S11 are repeatedly executed.

Accordingly, even if the user does not cause the input tool to touch the input-output panel 18, the user can freely change selection for the image capturing mode icon 106 and the options icons 141 to 143 by moving the input tool within the proximity response area Rc' with causing the input tool to stay in proximity to the input-output panel 18. In addition, with the change of the selection of an icon, the display form of the selected icon is changed, and the display of the function guide is switched.

On the other hand, when, in Step S10, the proximity of the input tool to the input-output panel 18 is not detected or the detected proximity position is out of the proximity response area Rc', it is determined that the input tool is not caused to be in proximity to the proximity response area Rc', and the processing proceeds to Step S12.

In Step S12, the display control unit 62 restores the response areas of individual icons. Namely, the display control unit 62 reduces the proximity response area Rc' of the image capturing mode icon 106 to the proximity response area Rc, and cancels the settings of the contact response areas Rt2 to Rt4 of the options icons 141 to 143. Accordingly, the states of the response areas of individual icons are restored from the states in FIG. 9 to the states in FIG. 7.

In Step S13, the display control unit 62 sets the options menu 133 to nondisplay through the digital signal processing unit 15. Namely, the options menu 133 is closed, the function guide and the cursor 131 are eliminated, and the display screen of the input-output panel 18 is restored to the state in FIG. 4.

After that, the processing returns to Step S3, and processing subsequent to Step S3 is executed.

On the other hand, in Step S8, when it is determined that the input tool is caused to touch the input-output panel 18, the processing proceeds to Step S14.

In Step S14, the display control unit 62 determines whether or not the input tool is caused to touch within the enlarged proximity response area Rc' of the image capturing mode icon 106. In addition, when the detected contact position of the input tool is located within the proximity response area Rc', it is determined that the input tool is caused to touch within the proximity response area Rc', and the processing to Step S15.

In Step S15, the display control unit 62 causes the display forms of individual icons or the like to be changed through the digital signal processing unit 15, in response to the contact position of the input tool.

In addition, in Step S15, basically the same processing as in Step S12 is performed while the proximity position is just replaced with the contact position. Namely, using the same determination method as in a case in which the proximity position is used, an icon under selection is detected on the basis of the contact position of the input tool. In addition, the display form of the icon under selection is changed, and a function guide corresponding to the icon is displayed.

In Step S16, in the same way as the processing in Step S7, the detection of the contact position of the input tool is performed, and the operation information including the detection result of the contact position of the input tool is supplied from the input detection unit 61 to the display control unit 62.

In Step S17, on the basis of the detection result due to the input detection unit 61, the display control unit 62 determines whether or not the input tool moves away from the input-output panel 18. When it is determined that the input tool does not move away from the input-output panel 18, in other words, it is determined that the input tool continues to be caused to touch the input-output panel 18, the processing returns to Step S14.

After that, until, in Step S14, it is determined that the input tool is not caused to touch within the proximity response area Rc' of the image capturing mode icon 106 or, in Step S17, it is determined that input tool moves away from the input-output panel 18, the processing operations from Step S14 to S17 are repeatedly executed.

Accordingly, by moving the input tool within the proximity response area Rc' with causing the input tool to touch the input-output panel 18, the user can freely change selection for the image capturing mode icon 106 and the options icons 141 to 143. In addition, with the change of the selection of an icon, the display form of the selected icon is changed, and the display of the function guide is switched.

On the other hand, when, in Step S17, it is determined that the input tool moves away from the input-output panel 18, the processing proceeds to Step S18. In addition, this corresponds to a case in which that input tool moves away from the input-output panel 18 with continuing to be caused to touch within the proximity response area Rc'.

In Step S18, the digital camera 1 executes a function assigned to the selected icon. Specifically, first, the display control unit 62 confirms the selection of an icon that has been selected immediately before the input tool moves away from the input-output panel 18. For example, when the input tool moves away from the input-output panel 18 during the selection of the image capturing mode icon 106, the selection of the image capturing mode icon 106 is confirmed. In the same way, when the input tool moves away from the input-output panel 18 during the selection of any one of the options icons 141 to 143, the selection of the options icon under selection is confirmed. Accordingly, on the basis of the contact position immediately before the input tool moves away from the input-output panel 18, the selection of the icon is confirmed.

In addition, when the selection of any one of the options icons 141 to 143 is confirmed, the display control unit 62 notifies the information processing device 52 of a function assigned to the icon, for example. By controlling individual portions of the digital camera 1, the information processing device 52 causes the function given notice of to be executed.

On the other hand, when the selection of the image capturing mode icon 106 is confirmed, the display control unit 62 causes the input-output panel 18 to display a display screen used for setting the image capturing mode, through the digital signal processing unit 15, for example.

Figure 11:
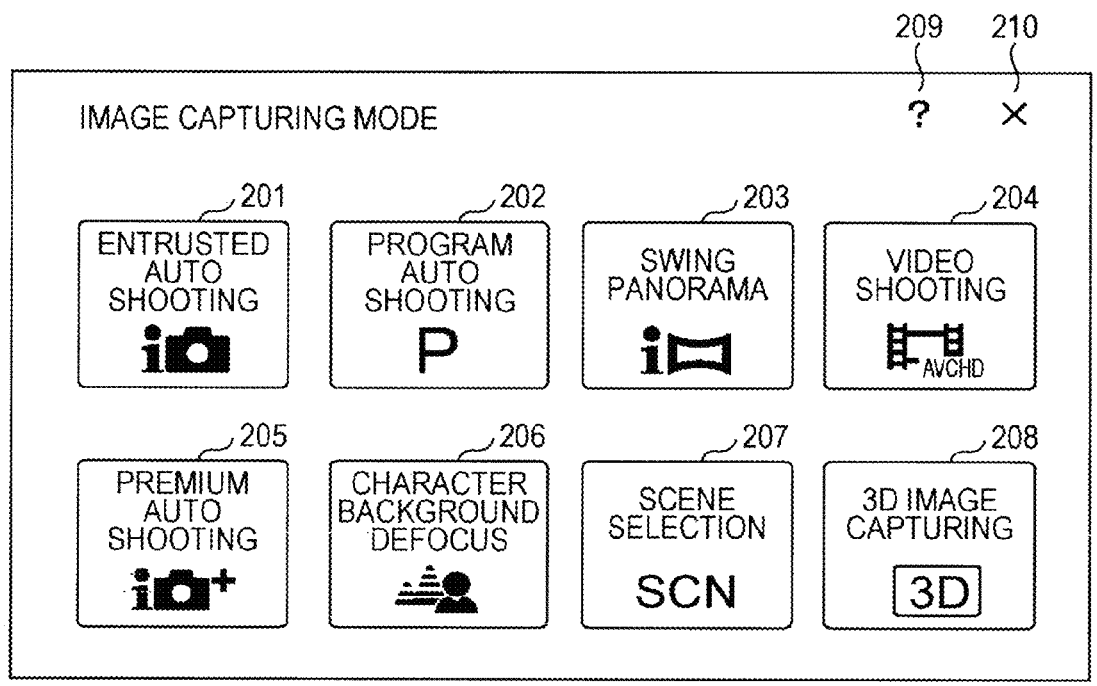
FIG. 11 is a diagram illustrating an example of an image capturing mode setting screen.

FIG. 11 illustrates an example of the display screen (hereinafter, referred to as "image capturing mode setting screen") displayed on the input-output panel 18.

In the image capturing mode setting screen in FIG. 11, icons 201 to 208, to each of which a function for setting one of image capturing modes of the digital camera 1 is assigned, are arrayed in a grid pattern. In addition, for example, the options icons 141 to 143 displayed on the options menu 133 are selected by the user from among the icons 201 to 208.

In addition, an icon 209, operated when the description of the function of each icon is displayed, and an icon 210, operated when the image capturing mode setting screen is closed and the image capturing standby screen in FIG. 4 is displayed, are displayed in an upper right corner.

In the same way as the operation for the options menu 133, by causing the input tool to be in proximity to or touch the input-output panel 18, the user can select a desired icon from among the icons 201 to 210 on the image capturing mode selection screen, and confirm the selection thereof.

In addition, the display control unit 62 notifies the information processing device 52 of a function assigned to the icon whose selection is confirmed. By controlling individual portions of the digital camera 1, the information processing device 52 causes the function given notice of to be executed.

After that, the display control processing is terminated.

On the other hand, when, in Step S14, the detected proximity position of the input tool is out of the proximity response area Rc', it is determined that the input tool touches outside of the proximity response area Rc', and the processing proceeds to Step S19.

In Step S19, in the same way as the processing in Step S12, the response areas of individual icons are restored.

In Step S20, in the same way as the processing in Step S13, the options menu 133 is set to nondisplay.

In Step S21, in the same way as the processing in Step S7, the detection of the contact position of the input tool is performed.

In Step S22, in the same way as the processing in Step S17, it is determined whether or not the input tool moves away from the input-output panel 18, and when it is determined that the input tool does not move away from the input-output panel 18, the processing returns to Step S21. After that, until it is determined that input tool moves away from the input-output panel 18, the processing operations in Step S21 and S22 are repeatedly executed.

In addition, when, in Step S22, it is determined that the input tool moves away from the input-output panel 18, the processing returns to Step S3, and the processing subsequent to Step S3 is executed.

In such a way as described above, just by causing the input tool to be in proximity to the image capturing mode icon 106, the user can cause the options menu 133 to be displayed. Furthermore, just by causing the input tool to touch the periphery of one of the options icons 141 to 143 without change, the user can cause a function assigned to the touched icon to be executed.

Accordingly, for example, compared with a case where an operation is performed in which, after the image capturing mode icon 106 is touched and the options menu 133 is displayed, one of the options icons 141 to 143 is touched, the number of operation steps is reduced. Therefore, it is possible to swiftly set an image capturing mode, and it is possible to perform image-capturing in a desired image capturing mode without missing a photo opportunity. In addition, it is possible to reduce the burden for the setting operation of an image capturing mode the user feels.

In addition, just by moving the input tool with causing the input tool to stay in proximity to the input-output panel 18, the selection of an icon is switched and the display form of the selected icon is changed. Therefore, the user can certainly recognize the selected icon before touching the input-output panel 18. Therefore, it is possible to reduce such an erroneous operation as the execution of an undesired function due to an erroneous touch to a different icon.

Furthermore, after causing the input tool to touch the input-output panel 18, it is also possible to freely select an icon until the input tool is moved away from the input-output panel 18. Therefore, even if the input tool is caused to touch an erroneous icon, it is possible to select a desired icon.

In addition, by translucently displaying the options menu 133 that is long and thin in a lateral direction, it is possible to reduce the size of a portion in which the through-the-lens image displayed in the area AC is hidden from view. Therefore, it is possible to set an image capturing mode while fully bringing a subject into view. Accordingly, the user can set an image capturing mode with recognizing the change of the subject, and perform image-capturing without missing a photo opportunity.

In addition, a situation does not occur in which, in order to set an image capturing mode, the whole screen is switched and the through-the-lens image is hidden from view, and hence it is possible to reduce stress the user feels owing to the change of the screen during image-capturing.

Furthermore, when the input tool is caused to be in proximity to the image capturing mode icon 106, the proximity response area of the image capturing mode icon 106 is enlarged. Therefore, even if the position of the input tool is slightly displaced during the operation thereof, the options menu 133 is continuously displayed without being closed. Accordingly, a situation in which the options menu 133 is erroneously closed is reduced, and the user can swiftly set the image capturing mode without stress.

<2. Modifications>

In addition, an embodiment of the present technology is not limited to the above-mentioned embodiment, and various modifications may be made without departing from the scope of the present technology.

[First Example of Modification]

For example, when the image capturing mode icon 106 (contact response area Rt1) is touched, the types of options icons displayed on the options menu 133 may be changed. Namely, depending on when the input tool is caused to be in proximity to or touch the image capturing mode icon 106, the content of the options menu 133 may also be changed.

[Second Example of Modification]

In addition, for example, after the image capturing mode icon 106 (contact response area Rt1) is touched, the display of the options menu 133 may also be fixed. Namely, when the image capturing mode icon 106 is touched during the display of the options menu 133, even if the input tool is moved away from the input-output panel 18 after that, the display of the options menu 133 may also be continued. Consequently, the user can carefully select an image capturing mode from within the options menu 133. In addition, for example, when the selection of an icon is confirmed or a portion located outside of the proximity response area Rc' is touched, the options menu 133 may also be closed.

[Third Example of Modification]

Furthermore, for example, when the input tool is brought close to the image capturing mode icon 106, the image capturing mode setting menu in FIG. 11 may also be displayed in place of the options menu 133. In this case, while the through-the-lens image is temporarily hidden from view, since, in the same way as in a case in which the options menu 133 is operated, just fewer operation steps used for selecting an icon are necessary, it is possible to swiftly select an image capturing mode from among more candidates and cause the through-the-lens image to be redisplayed.

[Fourth Example of Modification]

In addition, for example, when the input tool is not moved away from the input-output panel 18 (when not released) but the input tool touches the input-output panel 18, the selection of an icon may also be confirmed. Accordingly, it is possible to more swiftly set an image capturing mode.

[Fifth Example of Modification]

Furthermore, for example, when the proximity position or contact position of the input tool is out of the proximity response area Rc', the options menu 133 is not immediately closed but a standby time may be provided. Consequently, for example, even if the proximity position or contact position of the input tool is temporarily out of the proximity response area Rc', it is possible to continuously display the options menu 133 by swiftly returning the input tool to within the proximity response area Rc'.

[Sixth Example of Modification]

In addition, while, in the above description, an example has been illustrated in which an area (proximity response area Rc') used for determining whether or not the options menu 133 is set to nondisplay is set to the same area at the time of proximity and at the time of contact, the area may also be changed. For example, since the position of the input tool with respect to the input-output panel 18 is more easily recognized at the time of contact than at the time of proximity, the proximity response area Rc' may also be reduced in size at the time of contact, compared with the time of proximity.

[Seventh Example of Modification]

In the same way, the selection determination area of each icon may also be changed depending on the time of the proximity or the time of contact. For example, since, as described above, the position of the input tool with respect to the input-output panel 18 is more easily recognized at the time of contact than at the time of proximity, the selection determination area may also be reduced in size at the time of contact, compared with the time of proximity.

[Eighth Example of Modification]

In addition, while, in the above description, an example has been illustrated in which the selection determination area of each icon is made larger than the contact response area thereof, the contact response area may also be used as the selection determination area without change.

[Ninth Example of Modification]

Furthermore, the contact response area (or the selection determination area) of each icon does not necessarily include the all display area of the corresponding icon, and may also only include part of the display area of the corresponding icon. For example, when icons are adjacent to one another with being closely spaced, it is possible to prevent an adjacent icon from being erroneously selected, by setting the contact response area (or the selection determination area) to an area smaller than the display area of each icon.

In addition, with respect to each icon, the sizes of various kinds of response areas may also be changed.

[Tenth Example of Modification]

Furthermore, while, in the above description, an example has been illustrated in which the selection state of an icon is maintained when the proximity position or the contact position of the input tool is not included in the selection determination area of any one of icons, the selection of an icon may also be canceled with the options menu 133 being displayed.

[Eleventh Example of Modification]

In addition, the arrangement of the options icons within the options menu 133 is not limited to the above-mentioned example, and may also be arbitrarily set. For example, it is possible to arrange the options icons in tandem or two-dimensionally.

Furthermore, the shape, the size, the display position, the display direction, or the like of the options menu 133 may also be changed in response to the position of the image capturing mode icon 106, the direction or position of the sequence of icons including the image capturing mode icon 106, the content of the options menu 133, or the like.

[Twelfth Example of Modification]

In addition, while, in the above description, a menu configuration has been illustrated in which the image capturing mode icon 106 to be the trigger of the display of the options menu 133 is also selected, the present technology may also be applied to a case where a menu is displayed in the configuration of which an icon to be the trigger of menu display is not selected. For example, the case corresponds to a case, in the menu configuration of which the image capturing mode icon 106 is used for displaying the options menu 133 and only the options icons 141 to 143 are selected.

[Thirteenth Example of Modification]

Furthermore, the present technology may also be applied to a case in which an operation other than the setting of the image capturing mode is performed. For example, a case may be considered in which the shortcut functions of various kinds of operations are assigned to a plurality of shortcut icons and a menu including these shortcut icons is displayed when the input tool is caused to be in proximity to a predetermined icon.

[Fourteenth Example of Modification]

In addition, for example, the present technology may also be applied to a case in which items other than icons, such as a character string, a thumbnail of a moving image or a still image, and the like, are selected. Accordingly, for example, it is also possible to configure an item within the options menu 133, using a character string indicating a function name or the like.

[Fifteenth Example of Modification]

Furthermore, for example, as information relating to an item under selection, it is also possible to display information other than functions, such as a file name, an image capturing date, an updating date, or the like.

[Sixteenth Example of Modification]

In addition, the present technology may also be applied to a case in which a plurality of items can be selected at one time. For example, the present technology may also be applied to a case in which, by causing the input tool to be in proximity to or touch a portion located between a plurality of items, a plurality of items at the periphery thereof are selected at one time, or a case in which, since the ranges of the detected proximity position and contact position are large, a plurality of items can be selected at one time. In this case, for example, it is only necessary to change the display forms of the plural items under selection as described above.

[Seventeenth Example of Modification]

Furthermore, the present technology may also be applied to devices other than digital cameras, each of which includes a display device that can be operated owing to proximity or proximity and touch, and devices performing the display control of these devices. For example, the present technology may also be applied to personal computers (PCs), personal digital assistances (for example, a mobile phone, a portable music player, an electronic book reader, and the like), digital video cameras, game consoles, navigation devices, television receivers, displays, controllers (remote controllers are included) for various kinds of devices having display functions, and the like.

Specifically, for example, the present technology may also be applied to a case in which, when images are edited using a PC or the like, a menu used for selecting the type of editing is displayed with the images under editing continuing to be displayed. In addition, for example, the present technology may also be applied to a case in which, when a map is browsed using a PC, a navigation device, or the like, a menu used for selecting the display form (satellite photograph display, map display, land mark display, or the like) of the map is displayed.

The present disclosure contains subject matter related to that disclosed in Japanese Priority Patent Application JP 2010-291081 filed in the Japan Patent Office on Dec. 27, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus comprising:
   a memory including instructions for execution by one or more processing circuitry coupled to the memory, the one or more processing circuitry being operable when executing the instructions to:
   control a proximity response area of a displayed item which at least includes the displayed item;
   display a relation item in response to a detection of an object's proximity to the displayed item;
   change the proximity response area corresponding to the displayed item in response to the display of the relation item such that the changed proximity response area includes at least the relation item and the displayed item;
   restore the changed proximity response area back to the proximity response area in response to a proximity of the object to a region excluded by the changed proximity response area associated with the displayed item;
   before restoring the changed proximity response area back to the proximity response area, provide a standby time to prolong the display of the relation item, in response to the proximity of the object to the region excluded by the changed proximity response area, the prolonged display of the relation item being continued by returning the proximity of the object within the changed proximity response area before the standby time expires; and
   in response to a determination of touch of the object with the relation item, reduce the changed proximity response area in size and reduce a selection determination area in size, the selection determination area being defined (i) a range in a first direction of each of contact response areas within the changed proximity response area and (ii) a range in a second direction of the changed proximity response area.

2. The apparatus of claim 1, wherein the instructions cause to change a displayed form of a portion of the relation item in response to a contact of the object with the relation item.

3. The apparatus of claim 1, wherein the instructions cause to control a proximity response area that is larger than a size of the displayed item, the proximity response area being an area that is a criterion to detect whether the object is proximate to the displayed item.

4. The apparatus of claim 3, wherein the proximity response area is a rectangular area that surrounds the displayed item.

5. The apparatus of claim 1, wherein the instructions cause a display to highlight at least the displayed item based on the detection of the object being proximate to the displayed item.

6. The apparatus of claim 5, wherein the instructions cause to highlight the relation item by at least one of changing a color, size, shape, design and brightness of the relation item.

7. The apparatus of claim 1, wherein the instructions cause an option menu to be displayed in response to the detection of the object as being proximate to the displayed item.

8. The apparatus of claim 7, wherein the option menu is displayed translucently on an image displayed on a display and the relation item includes the option menu.

9. The apparatus of claim 7, wherein the proximity response area corresponding to the displayed item at least includes an area occupied by the option menu and the displayed item.

10. The apparatus of claim 7, wherein the option menu includes a plurality of option icons having respective contact response areas, and the proximity response area corresponding to the displayed item at least includes an area occupied by the respective contact response areas of the option icons.

11. The apparatus of claim 10, wherein the instructions cause a selected option icon among the plurality of option icons to be highlighted on a display in response to the proximity of the object to the selected option icon.

12. The apparatus of claim 10, wherein the instructions cause to change at least one option icon to another option icon in response to a contact of the object with a display.

13. The apparatus of claim 10, wherein the plurality of option icons remain present until the object touches a region on a display excluded by the proximity response area associated with the displayed item and removes from the display by a distance larger than a predetermined proximity detection range associated with the display.

14. The apparatus of claim 10, wherein the option menu is removed from a display in response to the detection of the object out of the proximity response area associated with the displayed item.

15. The apparatus of claim 10, wherein the option icons are removed from a display in response to a contact of the object out of the proximity response area associated with the displayed item.

16. The apparatus of claim 7, wherein the instructions also cause a function guide to be displayed, the function guide indicates functions assigned to respective option icons of the option menu.

17. The apparatus of claim 16, wherein the option menu is translucently displayed so that a background image remains at least partially visible on a display.

18. The apparatus of claim 7, wherein the option menu includes an option icon that is lower in rank than the displayed item.

19. The apparatus of claim 7, wherein the option menu is user-configured such that the option menu includes at least one or more option icons designated to be displayed in the option menu by a user.

20. The apparatus of claim 7, wherein the option menu includes a plurality of option icons having respective contact response areas, at least one of the contact response areas being smaller in area than an area occupied by a corresponding option icon.

21. The apparatus of claim 7, wherein the instructions cause to control a selection state of the option menu associated with the option menu in response to the detection of the object being proximate to the option menu.

22. The apparatus of claim 7, wherein the instructions cause to maintain a selection state of the option menu even when the object is beyond proximity of the option menu.

23. The apparatus of claim 1, further comprising:
a display, which includes a touch panel.

24. The apparatus of claim 1, wherein in response to the proximity of the object to a region above a display excluded by the selection determination area associated with an option icon, a selection state of the option icon remains unchanged.

25. The apparatus of claim 1, wherein the instructions cause to change a displayed form of a portion of the relation item in response to the proximity of the object to the relation item.

26. The apparatus of claim 1, wherein the standby time also includes a delay in removing the display of the relation item from a display.

27. The apparatus of claim 1, wherein the memory including instructions for execution by the one or more processing circuitry coupled to the memory, the one or more processing circuitry being further operable when executing the instructions to:
cause the object to be in a proximity to a portion or to touch the portion located between a plurality of items to select the plurality of items at one time.

28. A method of controlling a graphical user interface comprising:
controlling a proximity response area of a displayed item which at least includes the displayed item;
detecting an object's proximity to the displayed item;
displaying a relation item in response to detecting the object's proximity to the displayed item;
changing the proximity response area corresponding to the displayed item in response to displaying the relation item such that the changed proximity response area includes at least the relation item and the displayed item;
restoring the changed proximity response area back to the proximity response area in response to the object's proximity to a region excluded by the changed proximity response area associated with the displayed item;
before restoring the changed proximity response area back to the proximity response area, providing a standby time to prolong the display of the relation item, in response to the object's proximity to the region excluded by the changed proximity response area, the prolonged display of the relation item being continued by returning the object's proximity within the changed proximity response area before the standby time expires; and
in response to a determination of touch a the object with the relation item, reducing the changed proximity response area in size and reducing a selection determination area in size, the selection determination area being defined by (i) a range in a first direction of each of contact response areas within the changed proximity response area and (ii) a range in a second direction of the changed proximity response area.

29. A non-transitory computer storage device having instructions stored therein that when executed by a processing circuit implement a process comprising:
controlling a proximity response area of a displayed item which at least includes the displayed item;
detecting an object's proximity to the displayed item;
displaying a relation item in response to detecting the object's proximity to the displayed item;
changing the proximity response area corresponding to the displayed item in response to displaying the relation item such that the changed proximity response area includes at least the relation item and the displayed item; and
restoring the changed proximity response area back to the proximity response area in response to the object's proximity to a region excluded by the changed proximity response area associated with the displayed item;

before restoring the changed proximity response area back to the proximity response area, providing a standby time to prolong the display of the relation item, in response to the object's proximity to the region excluded by the changed proximity response area, the prolonged display of the relation item being continued by returning the object's proximity within the changed proximity response area before the standby time expires; and in response to a determination of touch a the object with the relation item, reducing the changed proximity response area in size and reducing a selection determination area in size, the selection determination area being defined by (i) a range in a first direction of each of contact response areas within the changed proximity response area and (ii) a range in a second direction of the changed proximity response area.

* * * * *